(12) United States Patent
Mendelson et al.

(10) Patent No.: US 8,504,318 B2
(45) Date of Patent: Aug. 6, 2013

(54) SYSTEM, METHOD AND COMPUTER PROGRAM FOR DETERMINING FLUID FLOW RATE USING A PRESSURE SENSOR AND A THERMAL MASS FLOW SENSOR

(75) Inventors: Jay Mendelson, Hartsdale, NY (US); Joseph C. Dille, Telford, PA (US); Anthony B. Kehoe, Yardley, PA (US); Jeffrey L. Whiteley, Perkasie, PA (US); Todd Berger, Tulsa, OK (US); Walter Dennis Robertson, III, Harleysville, PA (US)

(73) Assignee: Brooks Instruments, LLC, Hatfield, PA (US)

( * ) Notice: Subject to any disclaimer, the term of this patent is extended or adjusted under 35 U.S.C. 154(b) by 464 days.

(21) Appl. No.: 12/440,367

(22) PCT Filed: Mar. 5, 2008

(86) PCT No.: PCT/US2008/055911
§ 371 (c)(1),
(2), (4) Date: Jun. 17, 2010

(87) PCT Pub. No.: WO2009/110895
PCT Pub. Date: Sep. 11, 2009

(65) Prior Publication Data
US 2010/0286931 A1 Nov. 11, 2010

(51) Int. Cl.
*G01F 1/50* (2006.01)
(52) U.S. Cl.
USPC .................. 702/100; 702/45; 702/47; 702/50
(58) Field of Classification Search
USPC .................. 702/45, 47, 50, 98, 99, 100, 130, 702/138
See application file for complete search history.

(56) References Cited

U.S. PATENT DOCUMENTS

| 4,264,961 | A | 4/1981 | Nishimura et al. |
| 4,604,902 | A | 8/1986 | Sabin et al. |

(Continued)

FOREIGN PATENT DOCUMENTS

| WO | WO 2004/053371 A | 6/2004 |
| WO | WO 2005/109140 A | 11/2005 |

OTHER PUBLICATIONS

International Search Report and Written Opinion date mailed Mar. 5, 2009; PCT International Patent Application No. PCT/US2008/055911.

*Primary Examiner* — Mohamed Charioui
*Assistant Examiner* — Paul D Lee
(74) *Attorney, Agent, or Firm* — Patton Boggs LLP

(57) ABSTRACT

The present invention relates to a system, method, and computer program product for determining the flow rate of a fluid. The system, method, and computer program product generate a thermal sensor based mass flow rate for the fluid, where the thermal sensor based mass flow rate is determined at least in part from the thermal sensor signal (36). The system, method, and computer program product generate a pressure sensor based mass flow rate for the fluid, wherein the pressure sensor based mass flow rate is determined at least in part from the pressure sensor signal (51a). The system, method, and computer program product generate at least one calibration factor ($\psi$) using the thermal sensor based mass flow rate and the pressure sensor based mass flow rate. The system, method, and computer program product may generate a calibrated pressure sensor based mass flow rate by using the at least one calibration factor ($\psi$) to modify the pressure sensor based mass flow rate. The system, method, and computer program product may generate a calibrated thermal sensor based mass flow rate by using the at least one calibration factor ($\psi$) to modify the thermal sensor based mass flow rate.

78 Claims, 4 Drawing Sheets

U.S. PATENT DOCUMENTS

| | | |
|---|---|---|
| 5,331,995 A | 7/1994 | Westfall et al. |
| 7,401,624 B2 * | 7/2008 | Heer .............................. 137/554 |
| 2004/0177703 A1 * | 9/2004 | Schumacher et al. ..... 73/861.52 |
| 2006/0173642 A1 | 8/2006 | Shajii et al. |
| 2007/0233412 A1 * | 10/2007 | Gotoh et al. .................. 702/100 |
| 2007/0288180 A1 * | 12/2007 | Lull et al. ........................ 702/50 |

* cited by examiner

SYSTEM, METHOD AND COMPUTER PROGRAM FOR DETERMINING FLUID FLOW RATE USING A PRESSURE SENSOR AND A THERMAL MASS FLOW SENSOR

FIELD OF THE INVENTION

The present invention relates to a system, method, and computer program for determining fluid flow rate from a pressure sensor signal from a pressure sensor and a thermal sensor signal from a thermal mass flow sensor.

BACKGROUND OF THE INVENTION

Mass flow sensors measure and meter fluids, such as, for example, liquids, gases, or slurries. Thermal mass flow sensors are one type of mass flow sensor that determine mass flow via a measurement of heat transfer or energy consumption during a transfer of heat. By way of example, one particular type of thermal mass flow sensor determines flow rate by heating or cooling a fluid as it flows through a conduit and measuring a temperature change in the fluid. For example, a measurement of the fluid temperature upstream of a heating or cooling element can be compared to a measurement of fluid temperature at a location that is downstream of the heating or cooling element. This thermal loss characteristic will vary with mass flow rate. Therefore, the upstream and downstream temperature measurements can be compared in order to determine the amount of heat being carried away from a heating or cooling source. By way of example, the thermal mass flow sensor may output the difference between the upstream and downstream measurements as a thermal sensor signal to one or more electronics, which may, using well known techniques, use the thermal sensor signal to determine the mass flow rate of the fluid.

Since thermal mass flow sensors heat or cool mass for purposes of determining mass flow rate, thermal mass flow sensors while accurate and substantially stable, are inherently slow to respond to a change in flow. For example, the time constant of most thermal mass flow sensor ranges from about two (2) to about four (4) seconds. Therefore, during and shortly after fluctuations in the flow rate of the fluid, it is difficult to calculate an accurate mass flow rate from the thermal sensor signal until the flow rate stabilizes. Although attempts have been made to mathematically accelerate the response time of thermal mass flow sensors, these attempts have largely tended to increase the noise in the thermal sensor signal.

In addition to mathematical acceleration attempts, attempts have been made to mathematically correct mass flow measurements derived from the thermal sensor signal. Using well known techniques, the one or more electronics may then correct the mass flow rate determined from the thermal sensor signal.

However, no existing mass flow measurement device derives its mass flow measurement from more than one type of sensor. In particular, no existing mass flow measurement device derives its mass flow measurement via the combination of a thermal based flow measurement and a pressure based flow measurement. The present invention is directed to a mass flow measurement device that provides accurate measurements during substantially stable conditions and fluctuating fluid flow conditions via the combination of a thermal based flow measurement and a pressure based flow measurement.

SUMMARY OF THE INVENTION

The scope of the present invention is defined solely by the appended claims, and is not affected to any degree by the statements within this summary.

According to one embodiment of the present invention, a system for determining a flow rate of a fluid comprises at least one conduit, at least one thermal sensor, at least one pressure sensor, and one or more electronics. The at least one conduit defines a flow path along which the fluid flows. The at least one thermal sensor generates a thermal sensor signal, which is proportional to the mass flow rate of the fluid. The at least one pressure sensor generates a pressure sensor signal, which indicates the pressure of the fluid. The one or more electronics generate a thermal sensor based mass flow rate for the fluid, where the thermal sensor based mass flow rate is determined at least in part from the thermal sensor signal. The one or more electronics generate a pressure sensor based mass flow rate for the fluid, wherein the pressure sensor based mass flow rate is determined at least in part from the pressure sensor signal. The one or more electronics generate at least one calibration factor using the thermal sensor based mass flow rate and the pressure sensor based mass flow rate. The one or more electronics generate a calibrated pressure sensor based mass flow rate by using the at least one calibration factor to modify the pressure sensor based mass flow rate.

According to another embodiment of the present invention, a method of determining a flow rate of a fluid comprises the steps of using at least one thermal sensor to generate a thermal sensor signal, which is proportional to the mass flow rate of the fluid, using at least one pressure sensor to generate a pressure sensor measurement signal, which indicates the pressure of the fluid; and using one or more electronics to generate a thermal sensor based mass flow rate for the fluid, where the thermal sensor based mass flow rate is determined at least in part from the thermal sensor measurement signal, generate a pressure sensor based mass flow rate for the fluid, wherein the pressure sensor based mass flow rate is determined at least in part from the pressure sensor signal, generate at least one calibration factor using the thermal sensor based mass flow rate and the pressure sensor based mass flow rate, and generate a calibrated pressure sensor based mass flow rate by using the at least one calibration factor to modify the pressure sensor based mass flow rate.

According to another embodiment of the present invention, a computer program product comprises computer usable medium including executable code for executing a process for determining a flow rate of a fluid, the process comprises generating a thermal sensor based mass flow rate for the fluid, where the thermal sensor based mass flow rate is determined at least in part from a thermal sensor measurement signal from a thermal mass flow sensor, generating a pressure sensor based mass flow rate for the fluid, wherein the pressure sensor based mass flow rate is determined at least in part from a pressure sensor signal from a pressure sensor, generating at least one calibration factor using the thermal sensor based mass flow rate and the pressure sensor based mass flow rate, and generating a calibrated pressure sensor based mass flow rate by using the at least one calibration factor to modify the pressure sensor based mass flow rate.

According to another embodiment of the present invention, a system for determining a flow rate of a fluid comprises at least one conduit, at least one thermal sensor, at least one pressure sensor, and one or more electronics. The at least one conduit defines a flow path along which the fluid flows. The at least one thermal sensor generates a thermal sensor signal, which is proportional to the mass flow rate of the fluid. The at least one pressure sensor generates a pressure sensor signal, which indicates the pressure of the fluid. The one or more electronics generate a thermal sensor based mass flow rate for the fluid, where the thermal sensor based mass flow rate is determined at least in part from the thermal sensor signal. The one or more electronics generate a pressure sensor based mass flow rate for the fluid, wherein the pressure sensor based mass flow rate is determined at least in part from the pressure sensor signal. The one or more electronics generate at least one calibration factor using the thermal sensor based mass flow rate and the pressure sensor based mass flow rate. The one or more electronics generate a calibrated thermal sensor based mass flow rate by using the at least one calibration factor to modify the thermal sensor based mass flow rate.

According to another embodiment of the present invention, a method of determining a flow rate of a fluid comprises the steps of using at least one thermal sensor to generate a thermal sensor signal which is proportional to the mass flow rate of the fluid., using at least one pressure sensor to generate a pressure sensor measurement signal, which indicates the pressure of the fluid; and using one or more electronics to generate a thermal sensor based mass flow rate for the fluid, where the thermal sensor based mass flow rate is determined at least in part from the thermal sensor measurement signal, generate a pressure sensor based mass flow rate for the fluid, wherein the pressure sensor based mass flow rate is determined at least in part from the pressure sensor signal, generate at least one calibration factor using the thermal sensor based mass flow rate and the pressure sensor based mass flow rate, and generate a calibrated thermal sensor based mass flow rate by using the at least one calibration factor to modify the thermal sensor based mass flow rate.

According to another embodiment of the present invention, a computer program product comprises computer usable medium including executable code for executing a process for determining a flow rate of a fluid, the process comprises generating a thermal sensor based mass flow rate for the fluid, where the thermal sensor based mass flow rate is determined at least in part from a thermal sensor measurement signal from a thermal mass flow sensor, generating a pressure sensor based mass flow rate for the fluid, wherein the pressure sensor based mass flow rate is determined at least in part from a pressure sensor signal from a pressure sensor, generating at least one calibration factor using the thermal sensor based mass flow rate and the pressure sensor based mass flow rate, and generating a calibrated thermal sensor based mass flow rate by using the at least one calibration factor to modify the thermal sensor based mass flow rate.

Aspects

According to one aspect of the present invention, a system for determining a flow rate of a fluid comprises:
at least one conduit defining a flow path along which the fluid flows;
at least one thermal sensor that generates a thermal sensor signal, which is proportional to the mass flow rate of the fluid;
at least one pressure sensor that generates a pressure sensor signal, which indicates the pressure of the fluid;
one or more electronics that:
generate a thermal sensor based mass flow rate for the fluid, where the thermal sensor based mass flow rate is determined at least in part from the thermal sensor signal;
generate a pressure sensor based mass flow rate for the fluid, wherein the pressure sensor based mass flow rate is determined at least in part from the pressure sensor signal;
generate at least one calibration factor using the thermal sensor based mass flow rate and the pressure sensor based mass flow rate; and
generate a calibrated pressure sensor based mass flow rate by using the at least one calibration factor to modify the pressure sensor based mass flow rate.

Preferably, the at least one pressure sensor includes first and second pressure sensors that generate pressure sensor signals that indicate the pressure of the fluid and the pressure sensor based mass flow rate is determined at least in part from the pressure sensor signals.

Preferably, the at least one pressure sensor comprises a differential pressure cell which directly measures the pressure differential between two points in the fluid flow.

Preferably, the system includes a valve that regulates the fluid flow, the at least one pressure sensor includes first and second pressure sensors, the first pressure sensor is located upstream from the valve and the second pressure sensor is located downstream from the valve, the first and second pressure sensors generate pressure sensor signals that indicate the pressure of the fluid and the pressure sensor based mass flow rate is determined at least in part from the pressure sensor signals.

Preferably, the at least one calibration factor includes a series of calibration factors and the calibrated pressure sensor based mass flow rate is generated using the series of calibration factors to modify the pressure sensor based mass flow rate.

Preferably, the calibrated pressure sensor based mass flow rate substantially equals the thermal sensor mass flow rate during substantially stable flow conditions.

Preferably, the calibrated pressure sensor based mass flow rate, relative to the thermal sensor mass flow rate, more accurately reflects the fluid flow rate during or shortly after fluctuating fluid flow conditions.

Preferably, the system further comprises a mass flow controller that controls a valve position, wherein the calibrated pressure sensor based mass flow rate is used by the mass flow controller to control the position of the valve.

Preferably, the one or more electronics generates an output signal that indicates the calibrated pressure sensor based mass flow rate.

Preferably, the one or more electronics generate an output signal that switches between indicating the thermal sensor based mass flow rate or indicating the calibrated pressure sensor based mass flow rate.

Preferably, the one or more electronics generate a blended mass flow rate that is determined by using one or more weighing factors to generate a weighed calibrated pressure sensor based mass flow rate and a weighed thermal sensor based mass flow rate, which are combined to determine the blended mass flow rate.

Preferably, during stable flow conditions, the one or more electronics determines one or more fluid variables other than the fluid flow rate, wherein the one or more fluid variables are determined, at least in part from the pressure sensor signal and the thermal sensor signal.

Preferably, the one or more electronics generate an error signal when the at least one calibration factor falls outside of one or more acceptable limits.

Preferably, the calibrated pressure sensor based mass flow rate is used to control a valve, the one or more electronics store a plurality of valve positions and determine whether the stored valve positions indicate a trend that is characteristic of improper valve sequencing, and the one or more electronics generate an error signal in the event an improper valve sequencing trend is detected.

Preferably, the calibrated pressure sensor based mass flow rate is used to control a valve, the one or more electronics calculate the valve height necessary to achieve a flow set point, and the one or more electronics generate an error signal in the event the calculated valve height falls outside acceptable limits.

According to another aspect of the present invention, a method of determining a flow rate of a fluid comprises the steps of:
  using at least one thermal sensor to generate a thermal sensor signal, which is proportional to the mass flow rate of the fluid;
  using at least one pressure sensor to generate a pressure sensor measurement signal, which indicates the pressure of the fluid;
  using one or more electronics to:
    generate a thermal sensor based mass flow rate for the fluid, where the thermal sensor based mass flow rate is determined at least in part from the thermal sensor measurement signal;
    generate a pressure sensor based mass flow rate for the fluid, wherein the pressure sensor based mass flow rate is determined at least in part from the pressure sensor signal;
    generate at least one calibration factor using the thermal sensor based mass flow rate and the pressure sensor based mass flow rate; and
    generate a calibrated pressure sensor based mass flow rate by using the at least one calibration factor to modify the pressure sensor based mass flow rate.

Preferably, the at least one pressure sensor includes first and second pressure sensors that generate pressure sensor signals that indicate the pressure of the fluid and the pressure sensor based mass flow rate is determined at least in part from the pressure sensor signals.

Preferably, the at least one pressure sensor comprises a differential pressure cell which directly measures the pressure differential between two points in the fluid flow.

Preferably, the method further comprises using a valve to regulates the fluid flow, the at least one pressure sensor includes first and second pressure sensors, the first pressure sensor is located upstream from the valve and the second pressure sensor is located downstream from the valve, the first and second pressure sensors generate pressure sensor signals that indicate the pressure of the fluid, and the pressure sensor based mass flow rate is determined at least in part from the pressure sensor signals.

Preferably, the at least one calibration factor includes a series of calibration factors and the calibrated pressure sensor based mass flow rate is generated using the series of calibration factors to modify the pressure sensor based mass flow rate.

Preferably, the calibrated pressure sensor based mass flow rate substantially equals the thermal sensor mass flow rate during substantially stable flow conditions.

Preferably, the calibrated pressure sensor based mass flow rate, relative to the thermal sensor mass flow rate, more accurately reflects the fluid flow rate during or shortly after fluctuating fluid flow conditions.

Preferably, the method further comprises the step of using a mass flow controller to control a valve position, wherein the calibrated pressure sensor based mass flow rate is used by the mass flow controller to control the position of the valve.

Preferably, the method further comprises using the one or more electronics to generate an output signal that indicates the calibrated pressure sensor based mass flow rate.

Preferably, the method further comprises using the one or more electronics to generate an output signal that switches between indicating the thermal sensor based mass flow rate or indicating the calibrated pressure sensor based mass flow rate.

Preferably, the method further comprises using the one or more electronics to generate a blended mass flow rate determined by using one or more weighing factors to generate a weighed calibrated pressure sensor based mass flow rate and a weighed thermal sensor based mass flow rate, which are combined to determine the blended mass flow rate.

Preferably, the method further comprises using the one or more electronics, during stable flow conditions, to determine one or more fluid variables other than the fluid flow rate, wherein the one or more fluid variables are determined, at least in part from the pressure sensor signal and the thermal sensor signal.

Preferably, the method further comprises using the one or more electronics to generate an error signal when the at least one calibration factor falls outside of one or more acceptable limits.

Preferably, the method further comprises using the using the calibrated pressure sensor based mass flow rate to control a valve, using the one or more electronics to store a plurality of valve positions and determine whether the stored valve positions indicate a trend that is characteristic of improper valve sequencing, and using the one or more electronics to generate an error signal in the event an improper valve sequencing trend is detected.

Preferably, the method further comprises using the calibrated pressure sensor based mass flow rate to control a valve, using the one or more electronics to calculate the valve height necessary to achieve a flow set point, and using the one or more electronics to generate an error signal in the event the calculated valve height falls outside acceptable limits.

According to another aspect of the present invention, a computer program product comprises computer usable medium including executable code for executing a process for determining a flow rate of a fluid, the process comprises:
  generating a thermal sensor based mass flow rate for the fluid, where the thermal sensor based mass flow rate is determined at least in part from a thermal sensor measurement signal from a thermal mass flow sensor;
  generating a pressure sensor based mass flow rate for the fluid, wherein the pressure sensor based mass flow rate is determined at least in part from a pressure sensor signal from a pressure sensor;
  generating at least one calibration factor using the thermal sensor based mass flow rate and the pressure sensor based mass flow rate; and
  generating a calibrated pressure sensor based mass flow rate by using the at least one calibration factor to modify the pressure sensor based mass flow rate.

Preferably, the process further comprises determining the pressure sensor based mass flow rate at least in part from a pressure sensor signals from a pressure sensors.

Preferably, the process further comprises determining the pressure sensor based mass flow rate at least in part from at least one pressure sensor comprised of a differential pressure cell which directly measures the pressure differential between two points in the fluid flow.

Preferably, the process further comprises using the calibrated pressure sensor based mass flow rate to control a valve that fluid flow, determining the pressure sensor based mass flow rate at least in part from a pressure sensor signals from a pressure sensors, wherein the first pressure sensor is located upstream from the valve and the second pressure sensor is located downstream from the valve.

Preferably, the process further comprises generating a series of calibration factors using the thermal sensor based mass flow rate and the pressure sensor based mass flow rate and generating the calibrated pressure sensor based mass flow rate using the series of calibration factors to modify the pressure sensor based mass flow rate.

Preferably, the process further comprises generating the calibrated pressure sensor based mass flow rate so that the calibrated pressure sensor based mass flow rate substantially equals the thermal sensor mass flow rate during substantially stable flow conditions.

Preferably, the process further comprises generating the calibrated pressure sensor based mass flow rate so that the calibrated pressure sensor based mass flow rate, relative to the thermal sensor mass flow rate, more accurately reflects the fluid flow rate during or shortly after fluctuating fluid flow conditions.

Preferably, the process further comprises using the calibrated pressure sensor based mass flow rate to control the position of the valve.

Preferably, the process further comprises using the one or more electronics to generate an output signal that indicates the calibrated pressure sensor based mass flow rate.

Preferably, the process further comprises using the one or more electronics to generate an output signal that switches between indicating the thermal sensor based mass flow rate or indicating the calibrated pressure sensor based mass flow rate.

Preferably, the process further comprises using the one or more electronics to generate a blended mass flow rate determined by using one or more weighing factors to generate a weighed calibrated pressure sensor based mass flow rate and a weighed thermal sensor based mass flow rate, which are combined to determine the blended mass flow rate.

Preferably, the process further comprises using the one or more electronics, during stable flow conditions, to determine one or more fluid variables other than the fluid flow rate, wherein the one or more fluid variables are determined, at least in part from the pressure sensor signal and the thermal sensor signal.

Preferably, the process further comprises using the one or more electronics to generate an error signal when the at least one calibration factor falls outside of one or more acceptable limits Preferably, the process further comprises using the calibrated pressure sensor based mass flow rate to control a valve, using the one or more electronics to store a plurality of valve positions and determine whether the stored valve positions indicate a trend that is characteristic of improper valve sequencing, and using the one or more electronics to generate an error signal in the event an improper valve sequencing trend is detected.

Preferably, the process further comprises using the calibrated pressure sensor based mass flow rate to control a valve, using the one or more electronics to calculate the valve height necessary to achieve a flow set point, and using the one or more electronics to generate an error signal in the event the calculated valve height falls outside acceptable limits.

According to another aspect of the present invention, a system for determining a flow rate of a fluid comprises:
at least one conduit defining a flow path along which the fluid flows;
at least one thermal sensor that generates a thermal sensor signal, which is proportional to the mass flow rate of the fluid;
at least one pressure sensor that generates a pressure sensor signal, which indicates the pressure of the fluid;
one or more electronics that:
generate a thermal sensor based mass flow rate for the fluid, where the thermal sensor based mass flow rate is determined at least in part from the thermal sensor signal;
generate a pressure sensor based mass flow rate for the fluid, wherein the pressure sensor based mass flow rate is determined at least in part from the pressure sensor signal;
generate at least one calibration factor using the thermal sensor based mass flow rate and the pressure sensor based mass flow rate; and
generate a calibrated thermal sensor based mass flow rate by using the at least one calibration factor to modify the thermal sensor based mass flow rate.

Preferably, the at least one pressure sensor includes first and second pressure sensors that generate pressure sensor signals that indicate the pressure of the fluid and the pressure sensor based mass flow rate is determined at least in part from the pressure sensor signals.

Preferably, the at least one pressure sensor comprises a differential pressure cell which directly measures the pressure differential between two points in the fluid flow.

Preferably, the system includes a valve that regulates the fluid flow, the at least one pressure sensor includes first and second pressure sensors, the first pressure sensor is located upstream from the valve and the second pressure sensor is located downstream from the valve, the first and second pressure sensors generate pressure sensor signals that indicate the pressure of the fluid and the pressure sensor based mass flow rate is determined at least in part from the pressure sensor signals.

Preferably, the at least one calibration factor includes a series of calibration factors and the calibrated thermal sensor based mass flow rate is generated using the series of calibration factors to modify the thermal sensor based mass flow rate.

Preferably, the calibrated thermal sensor based mass flow rate substantially equals the thermal sensor mass flow rate during substantially stable flow conditions.

Preferably, the calibrated thermal sensor based mass flow rate, relative to the thermal sensor mass flow rate, more accurately reflects the fluid flow rate.

Preferably, the system further comprises a mass flow controller that controls a valve position, wherein the calibrated thermal sensor based mass flow rate is used by the mass flow controller to control the position of the valve.

Preferably, the one or more electronics generates an output signal that indicates the calibrated thermal sensor based mass flow rate.

Preferably, during stable flow conditions, the one or more electronics determines one or more fluid variables other than the fluid flow rate, wherein the one or more fluid variables are determined, at least in part from the pressure sensor signal and the thermal sensor signal.

Preferably, the one or more electronics generate an error signal when the at least one calibration factor falls outside of one or more acceptable limits.

Preferably, the calibrated thermal sensor based mass flow rate is used to control a valve, the one or more electronics store a plurality of valve positions and determine whether the stored valve positions indicate a trend that is characteristic of improper valve sequencing, and the one or more electronics generate an error signal in the event an improper valve sequencing trend is detected.

Preferably, the calibrated thermal sensor based mass flow rate is used to control a valve, the one or more electronics calculate the valve height necessary to achieve a flow set point, and the one or more electronics generate an error signal in the event the calculated valve height falls outside acceptable limits.

According to another aspect of the present invention, a method of determining a flow rate of a fluid comprises the steps of:
  using at least one thermal sensor to generate a thermal sensor signal which is proportional to the mass flow rate of the fluid; using at least one pressure sensor to generate a pressure sensor measurement signal, which indicates the pressure of the fluid;
  using one or more electronics to:
    generate a thermal sensor based mass flow rate for the fluid, where the thermal sensor based mass flow rate is determined at least in part from the thermal sensor measurement signal;
    generate a pressure sensor based mass flow rate for the fluid, wherein the pressure sensor based mass flow rate is determined at least in part from the pressure sensor signal;
    generate at least one calibration factor using the thermal sensor based mass flow rate and the pressure sensor based mass flow rate; and
    generate a calibrated thermal sensor based mass flow rate by using the at least one calibration factor to modify the thermal sensor based mass flow rate.

Preferably, the at least one pressure sensor includes first and second pressure sensors that generate pressure sensor signals that indicate the pressure of the fluid and the pressure sensor based mass flow rate is determined at least in part from the pressure sensor signals.

Preferably, the at least one pressure sensor comprises a differential pressure cell which directly measures the pressure differential between two points in the fluid flow.

Preferably, the method further comprises using a valve to regulates the fluid flow, the at least one pressure sensor includes first and second pressure sensors, the first pressure sensor is located upstream from the valve and the second pressure sensor is located downstream from the valve, the first and second pressure sensors generate pressure sensor signals that indicate the pressure of the fluid, and the pressure sensor based mass flow rate is determined at least in part from the pressure sensor signals.

Preferably, the at least one calibration factor includes a series of calibration factors and the calibrated thermal sensor based mass flow rate is generated using the series of calibration factors to modify the thermal sensor based mass flow rate.

Preferably, the calibrated thermal sensor based mass flow rate substantially equals the pressure sensor mass flow rate during substantially stable flow conditions.

Preferably, the calibrated thermal sensor based mass flow rate, relative to the thermal sensor mass flow rate, more accurately reflects the fluid flow rate.

Preferably, the method further comprises the step of using a mass flow controller to control a valve position, wherein the calibrated thermal sensor based mass flow rate is used by the mass flow controller to control the position of the valve.

Preferably, the method further comprises using the one or more electronics to generate an output signal that indicates the calibrated thermal sensor based mass flow rate.

Preferably, the method further comprises using the one or more electronics, during stable flow conditions, to determine one or more fluid variables other than the fluid flow rate, wherein the one or more fluid variables are determined, at least in part from the pressure sensor signal and the thermal sensor signal.

Preferably, the method further comprises using the one or more electronics to generate an error signal when the at least one calibration factor falls outside of one or more acceptable limits.

Preferably, the method further comprises using the using the calibrated thermal sensor based mass flow rate to control a valve, using the one or more electronics to store a plurality of valve positions and determine whether the stored valve positions indicate a trend that is characteristic of improper valve sequencing, and using the one or more electronics to generate an error signal in the event an improper valve sequencing trend is detected.

Preferably, the method further comprises using the calibrated thermal sensor based mass flow rate to control a valve, using the one or more electronics to calculate the valve height necessary to achieve a flow set point, and using the one or more electronics to generate an error signal in the event the calculated valve height falls outside acceptable limits.

According to another aspect of the present invention, a computer program product comprises computer usable medium including executable code for executing a process for determining a flow rate of a fluid, the process comprises:
  generating a thermal sensor based mass flow rate for the fluid, where the thermal sensor based mass flow rate is determined at least in part from a thermal sensor measurement signal from a thermal mass flow sensor;
  generating a pressure sensor based mass flow rate for the fluid, wherein the pressure sensor based mass flow rate is determined at least in part from a pressure sensor signal from a pressure sensor;
  generating at least one calibration factor using the thermal sensor based mass flow rate and the pressure sensor based mass flow rate; and
  generating a calibrated thermal sensor based mass flow rate by using the at least one calibration factor to modify the thermal sensor based mass flow rate.

Preferably, the process further comprises determining the pressure sensor based mass flow rate at least in part from a pressure sensor signals from a pressure sensors.

Preferably, the process further comprises determining the pressure sensor based mass flow rate at least in part from at least one pressure sensor comprised of a differential pressure cell which directly measures the pressure differential between two points in the fluid flow.

Preferably, the process further comprises using the calibrated thermal sensor based mass flow rate to control a valve that fluid flow, determining the pressure sensor based mass flow rate at least in part from a pressure sensor signals from a pressure sensors, wherein the first pressure sensor is located upstream from the valve and the second pressure sensor is located downstream from the valve.

Preferably, the process further comprises generating a series of calibration factors using the thermal sensor based mass flow rate and the pressure sensor based mass flow rate and generating the calibrated thermal sensor based mass flow rate using the series of calibration factors to modify the thermal sensor based mass flow rate.

Preferably, the process further comprises generating the calibrated thermal sensor based mass flow rate so that the calibrated thermal sensor based mass flow rate substantially equals the pressure sensor mass flow rate during substantially stable flow conditions.

Preferably, the process further comprises generating the calibrated thermal sensor based mass flow rate so that the calibrated thermal sensor based mass flow rate, relative to the thermal sensor mass flow rate, more accurately reflects the fluid flow rate.

Preferably, the process further comprises using the calibrated thermal sensor based mass flow rate to control the position of the valve.

Preferably, the process further comprises using the one or more electronics to generate an output signal that indicates the calibrated thermal sensor based mass flow rate.

Preferably, the process further comprises using the one or more electronics, during stable flow conditions, to determine one or more fluid variables other than the fluid flow rate, wherein the one or more fluid variables are determined, at least in part from the pressure sensor signal and the thermal sensor signal.

Preferably, the process further comprises using the one or more electronics to generate an error signal when the at least one calibration factor falls outside of one or more acceptable limits.

Preferably, the process further comprises using the calibrated thermal sensor based mass flow rate to control a valve, using the one or more electronics to store a plurality of valve positions and determine whether the stored valve positions indicate a trend that is characteristic of improper valve sequencing, and using the one or more electronics to generate an error signal in the event an improper valve sequencing trend is detected.

Preferably, the process further comprises using the calibrated thermal sensor based mass flow rate to control a valve, using the one or more electronics to calculate the valve height necessary to achieve a flow set point, and using the one or more electronics to generate an error signal in the event the calculated valve height falls outside acceptable limits.

DETAILED DESCRIPTION OF THE PRESENTLY PREFERRED EMBODIMENT

Figure 1:
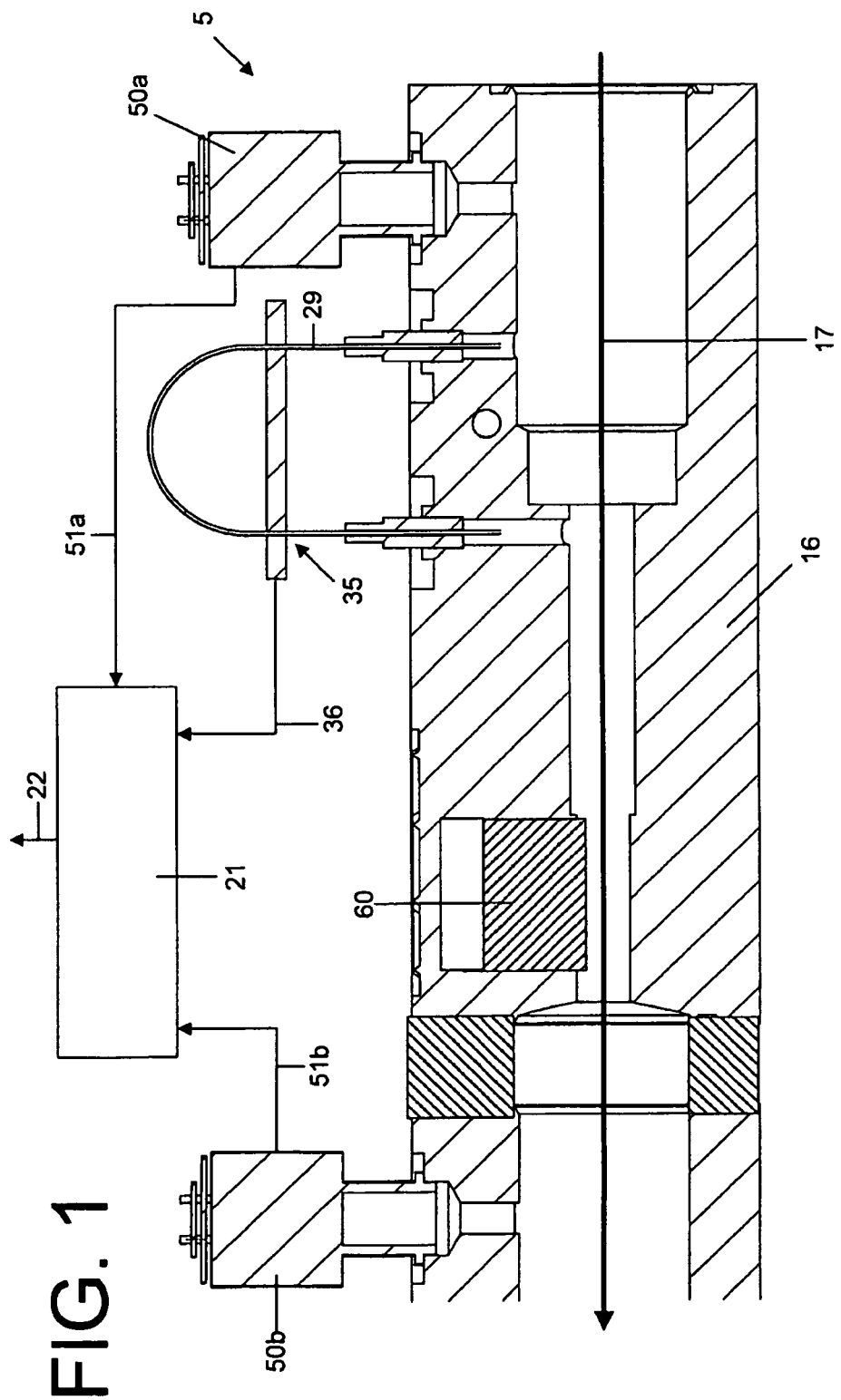
FIG. 1 depicts a perspective view of a mass flow sensor of an embodiment of the present invention.

FIG. 1 shows a mass flow measurement device 5 according to an embodiment of the present invention. As shown, the mass flow measurement device 5 is provided with a flow conduit 16, one or more electronics 21, a thermal mass flow sensor 35, and first and second pressure sensors 50a, 50b.

As shown in FIG. 1, the flow conduit 16 defines a flow path 17 along which a fluid, such as a liquid, gas, or slurry, flows. As the fluid flows along the flow path 17 the mass flow measurement device 5 measures the mass flow rate of the fluid. For this purpose, the one or more electronics 21 of the present embodiment receive a thermal sensor signal 36 from thermal mass flow sensor 35 and pressure sensor signals 51a, 51b from pressure sensors 50a, 50b.

Those of ordinary skill in the art will appreciate that thermal mass flow sensors, such as thermal mass flow sensor 35, measure the mass flow rate of a fluid. Although alternative embodiments may use any type of thermal mass flow sensor, the thermal mass flow sensor 35 of the present embodiment measures a temperature change in the fluid as it flows in a bypass tube 29 and is heated by the thermal mass flow sensor 35. Accordingly, the thermal mass flow sensor 35 of the present embodiment includes a heating element (not shown) and upstream and downstream temperature sensors (not shown). The thermal mass flow sensor 35 measures the temperature change in the fluid as it is heated and provides this measurement as a thermal sensor signal 36 to the one or more electronics 21.

Although, in the present embodiment the thermal mass flow sensor 35 measures a temperature change in the fluid as it flows within a bypass tube 29, it is within the scope of the present embodiment to utilize thermal mass flow sensors that operate according to alternative principals. It is within the scope of the present invention to use any type of thermal mass flow sensor that measures heat transfer to or from a moving fluid. Those of ordinary skill in the art will appreciate that the measured heat transfer to or from a moving fluid is proportional to the mass flow rate of the fluid. However, those of ordinary skill in the art will appreciate that, depending on the type of thermal mass flow sensor utilized, the thermal sensor signal 36 may indicate a variety of thermal or electrical related characteristics that are proportional to the mass flow rate of the fluid.

By way of example, and not limitation, it is within the scope of the present invention to utilize other thermal mass flow sensors, such as, for example, and not limitation an insertion type thermal mass flow sensor, which typically makes use of an upstream heater, and a downstream sensor both of which are inserted into the flow path 17. The insertion type thermal mass flow meter can be operated in either a constant power or a constant temperature difference mode. The constant temperature difference mode refers to a mode of operation whereby the temperature difference between the heater and ambient fluid is kept constant by varying the power. The power output measurement may be supplied to the one or more electronics 21 as the thermal sensor signal 36.

In addition to at least one thermal mass flow sensor 35, the present embodiment includes at least one pressure sensor, and preferably at least two pressure sensors, such as pressure sensors 50a, 50b. Those of ordinary skill in the art will appreciate that pressure sensors, such as pressure sensors 50a, 50b, measure the pressure of the fluid as it flows. Furthermore, those of ordinary skill in the art will appreciate that fluid pressure measurements may be used to calculate the mass flow rate of the fluid.

Although it is within the scope of the present invention to use any type or number of pressure sensors, the pressure sensors 50a, 50b of the present embodiment communicate with the fluid and directly measure the pressure of the fluid in the conduit 10. As shown in FIG. 1, the pressure sensor 50a measures the pressure of the fluid upstream from a valve 60 and the pressure sensor 50b measures the pressure of the fluid downstream from the valve 60. The pressure sensors 50a, 50b provide their respective measurements as respective pressure sensor signals 51a, 51b to the one or more electronics 21. Although in the present embodiment, the mass flow measurement device 5 includes pressure sensors 50a, 50b that are located upstream and downstream from a valve 60, it is within the scope of the present invention to utilize other arrangements. By way of example, fluid pressure may be indirectly measured by locating one or more pressure sensors on the outside of the conduit 17. By way of yet another example, a valve, such as, valve 60, may not be included in all embodiments.

According to one aspect of the present embodiment, the one or more electronics 21 uses the thermal sensor signal 36 to calculate a thermal sensor based mass flow rate. According to another aspect of the present embodiment, the one or more electronics uses the pressure measurement signals 51a,51b to calculate a pressure sensor based mass flow rate. According to yet another aspect of the present embodiment, the one or more electronics 21 uses the thermal sensor signal based mass flow rate and the pressure sensor signal based mass flow rate to determine a calibration factor $\Psi$ or series of calibration factors $\Psi_N$. According to still another aspect of the present embodiment, the one or more electronics 21 uses the calibration factor $\Psi$ or series of calibration factors $\Psi_N$ and the pressure sensor based mass flow rate to determine a calibrated pressure sensor based mass flow rate. According to yet another aspect of the present invention, the one or more electronics 21 outputs the calibrated pressure sensor mass flow rate as an output signal 22. Those of ordinary skill in the art will appreciate that the one or more electronics 21 may output the calibrated pressure sensor based mass flow rate to a display, memory, or other devices, such as, for example, and not limited to a computer, a valve, a mass flow controller, such as, for example, the mass flow controller 80 shown in FIGS. 2 and 3 or the mass flow controller 100 shown in FIG. 4.

Calculation of the Thermal Sensor Based Mass Flow Rate:

According to one aspect of the present embodiment, the thermal sensor based mass flow rate is calculated from at least one thermal sensor measurement signal, such as, for example, and not limitation, thermal sensor measurement signal 36 shown in FIG. 1. Those of ordinary skill in the art will appreciate that it is within the scope of the present invention to utilize any number of formulas for purposes of determining the thermal sensor based mass flow rate. The particular formula used to calculate the thermal sensor based mass flow rate will depend on a number of factors, including the type and number of thermal mass flow sensors used, the type and number of pressure sensors used, the type of fluid, and the amount of accuracy that is desired. Accordingly when determining the thermal sensor based mass flow rate it is within the scope of the present invention to utilize any formula that uses one or more heat transfer measurements or one or more energy consumption measurements as the fundamental mass flow measuring criteria. For example, and not limited to, the following formula (1) may be used in determining the first mass flow measurement:

$$\Delta T = A \times P \times Cp \times m \qquad (1)$$

Where:
ΔT=Temperature difference (° K.)
A=Constant of proportionality (S²-° K.²/kJ²)
P=Heater power (kJ/s)
Cp=Specific heat of the gas at constant pressure (kJ/kg-° K.)
m=Mass flow (kg/s)

The above formula (1) above is a simplification of the formulas which govern mass flow in a typical thermal mass flow meter. A more rigorous theoretical framework may incorporate separate, but coupled, energy conservation formulas for the conduit and the fluid contained within. Formulas (2) and (3) below represent other possible formulas, which may be used to determine the thermal sensor based mass flow rate of the fluid. Formulas (2) and (3) represent one such possible formulation of energy conservation formulas for a bypass conduit, such as bypass conduit 29, and the fluid, respectively:

$$Cp_t(\pi R_2^2 - \pi R_1^2)\rho_t \frac{dT_t}{dt} = h_g 2\pi R_1(T_g(x) - T_t(x)) - \qquad (2)$$
$$h_t 2\pi R_2(T_t(x) - T_e(x)) + k_t(\pi R_2^2 - \pi R_1^2)\frac{d^2 T_t(x)}{dx^2} + s(x)$$

$$Cp_g(\pi R_1^2)\rho_g\left(\frac{dT_g}{dt} + u\frac{dT_g}{dx}\right) = k_g \pi R_1^2 \frac{d^2 T_g(x)}{dx^2} + h_g 2\pi R_1(T_t(x) - T_g(x)) \qquad (3)$$

Where:
$Cp_t$=Bypass Conduit Specific Heat (J/kg-° C.)
$Cp_g$=Gas Specific Heat (J/kg-° C.)
k=Thermal Conductivity (W/m-° C.)
h=Heat Transfer Coefficient (W/m²-° C.)
ρ=Density (kg/m³)
T=Temperature (° C.)
t=Time (s)
u=Gas Velocity (m/s)
s=Heater Power/Unit Length (W/m)
$R_1$=Bypass Conduit Inner Radius (m).
$R_2$=Bypass Conduit Outer Radius (m)
Subscripts:
   t=Tube
   e=Environment
   g=Gas.

Although the foregoing discloses possible formulas for computing the thermal sensor based mass flow rate from a thermal sensor measurement signal, such as, for example, and not limitation, thermal sensor measurement signal 36 those of ordinary skill in the art will appreciate that there are numerous thermal mass flow sensors and numerous formulas that may be utilized within the scope of the present invention. By way of example, in embodiments where the thermal mass flow sensor is an insertion type thermal mass flow meter, when operating in the constant temperature difference mode, a formula which can be used to relate the power loss to the mass flow is King's Law (formula 4).

$$\frac{\dot{q}L}{D^2(T-T_A)k} = A' + B'(\rho U d / \mu)^{0.5} \qquad (4)$$

Where:
q=Heater power,
D=Diameter of flow channel,
T=Temperature of the heater,
$T_A$=Temperature of the ambient fluid,
k=Thermal conductivity of the fluid,
ρ=Fluid density,
μ=Fluid viscosity,
d=Heater probe diameter, and
A' & B'=Calibration factors.

Formula (4) can be expressed so that the fixed geometrical and fluid properties are folded into the constants A and B as shown below in Formula (5) below:

$$V^2 = A'' + B'' U^{0.5} \qquad (5)$$

Where:
V=heater voltage required to maintain the constant temperature difference,
U=gas velocity, and
A" and B"=calibration factors.

Calculation of the Pressure Sensor Based Mass Flow Rate:

According to another aspect of the present embodiment, the pressure sensor based mass flow rate is calculated from at least one pressure sensor signal, such as, for example, and not limitation, pressure measurement signals $51a, 51b$. In alternative embodiments, at least one pressure sensor may be provided that functions as a differential pressure cell, which directly measures the pressure differential between two points in the flow. Those of ordinary skill in the art will appreciate that any number of formulas may be used for purposes of determining the pressure sensor based mass flow rate. The particular formulas used to calculate the pressure sensor based mass flow rate will depend on a number of factors, including the type and number of pressure sensors used, the type of fluid, the amount of accuracy that is desired. Accordingly, it is within the scope of the present invention to utilize any formula that uses one or more pressure measurements as the fundamental mass flow measuring criteria. By way of example, and not limitation, the following formulas (6) and (7) may be used to determine the pressure sensor based mass flow rate of the fluid:

$$\text{Where } \frac{p_2}{p_1} > 0.5, Kv = \frac{Q\max}{514} \times \sqrt{\frac{\rho \times T}{(p_1 - p_2) \times p_2}} ; \quad (6)$$

or $$\text{Where: } \frac{p_2}{p_1} \leq 0.5, Kv = \frac{Q\max}{257 \times p_1} \times \sqrt{\rho \times T} \quad (7)$$

Where:
Qmax=Maximum flow ($m^3_n/h$)
$p_1$=Upstream pressure (bar abs)
$p_2$=Downstream pressure (bar abs)
T=Gas temperature (° K.)
ρ=Gas Density ($kg/m^3_n$)
Kv=Flow Coefficient.

Those of ordinary skill in the art will appreciate that the Kv flow coefficient is derived from the flow data obtained on an incompressible fluid, typically water and must be adapted for use with the particular flowing gas. Two assumptions are made in this adaptation. First, the gas temperature is assumed to maintain the inlet temperature as it flows through the orifice. Second, the flow through the orifice is assumed to occur at a constant density. This density can either be the inlet density, the outlet density, or an average density.

Formulas (6) and (7) are simplified forms of the pressure drop formula for incompressible flow that have been adapted to compressible flow situations. While formulas (6) and (7) have been used for years with good success by a number of manufacturers, the constant temperature and density assumptions inherent in its formulation are not physically realistic under most circumstances. Accordingly, those of ordinary skill in the art will appreciate that it is within the scope of the present invention to utilize other formulas. For example, and not limitation, the following simple linear formula (8) can be used to model the laminar flow through a porous media element $$\Delta P_{PM} = Q_{act} * \mu * K \quad (8)$$

Where:
$\Delta P_{PM}$=The pressure drop across a porous media element;
$Q_{act}$=The actual gas flow through the porous media;
μ=An absolute gas viscosity; and
K=A porous media constant.

The pressure drop across an orifice is easily modeled via the orifice coefficient formula, which can be derived from fundamental first principles of one-dimensional compressible flow theory. The resulting formula (9) for the non-choked (i.e., sub-sonic) flow of real gases through an orifice is:

$$\dot{m}_{orifice} = CA\sqrt{2\rho_1 P_1 \left(\frac{k}{k-1}\right)[(P_2/P_1)^{2/k} - (P_2/P_1)^{(k+1)/k}]} \quad (9)$$

Where:
$\dot{m}_{oriface}$=mass flow rate (kg/s)
C=orifice flow coefficient, dimensionless (often denoted as K),
$A_2$=cross-sectional area of the orifice hole ($m^2$)
$\rho_1$=upstream real gas density ($kg/m^3$)
$P_1$=upstream gas pressure (Pa with dimensions of kg/(m·s)),
k=Ideal Gas Specific Heat Ratio
$P_2$=downstream pressure in the orifice hole (Pa with dimensions of kg/(m·s)
T1=absolute upstream gas temperature (° K.).

The resulting formula (10) for the choked, i.e., where $P_2/P_1$ is less than or equal to $$P_{critical}, \text{ where } P_{critical} = \left(\frac{k+1}{2}\right)^{(k)/(1-k)},$$

flow of gases through an orifice is:

$$\dot{m}_{orifice} = CA\sqrt{k\rho P_1 \left(\frac{2}{k+1}\right)^{(k+1)/(k-1)}} \quad (10)$$

Where:
$\dot{m}_{oriface}$=mass flow rate (kg/s)
C=orifice flow coefficient, dimensionless (often denoted as K),
$A_2$=cross-sectional area of the orifice hole ($m^2$)
$\rho_1$=upstream real gas density ($kg/m^3$)
$P_1$=upstream gas pressure (Pa with dimensions of kg/(m·s)),
k=Ideal Gas Specific Heat Ratio
$P_2$=downstream pressure in the orifice hole (Pa with dimensions of kg/(m·s)
T1=absolute upstream gas temperature (° K.).

The above formulas (9) and (10) make use of a downstream-to-upstream pressure ratio. Alternatively, it is not uncommon in the art to make use of an upstream-to-downstream pressure ratio. Either convention is accepted, but the notation must be consistently used.

Choked flow refers to the situation in which the flow has attained sonic velocity. This can occur in both fully and partially open valve situations. Assuming ideal gas behavior, steady state choked flow occurs when the ratio of the absolute downstream pressure to the absolute upstream pressure is equal to or greater than $$\left(\frac{k+1}{2}\right)^{(k)/(1-k)},$$

where k is the specific heat ratio of the gas (sometimes called the isentropic expansion factor and denoted as γ). For many gases, (k) ranges from about 1.09 to about 1.7; and, therefore, $$\left(\frac{k+1}{2}\right)^{(k)/(1-k)}$$

ranges from 0.59 to about 0.48,which means that choked flow usually occurs when the absolute downstream pressure is roughly less than half of the upstream pressure.

If desired, the inlet density in Formulas (9) and (10) can be eliminated via an Ideal Gas Law, and the Ideal Gas law limitation can be obviated via the compressibility factor. This results in formulas that are equivalent to Formulas (9) and (10) but different in form.

Figure 4:
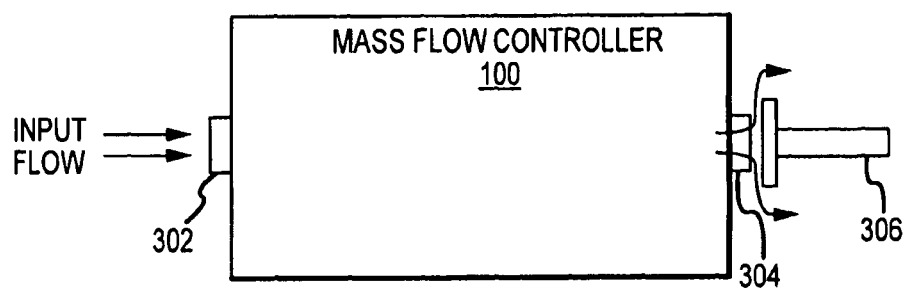
FIG. 4 depicts a perspective view of a mass flow controller of an embodiment of the present invention.

By way of yet another example, conservation of mass can be used to develop a transient fluids model for the flow geometry depicted in FIG. 4. FIG. 4 is a model of the mass flow controller 100 in which the mass flow measurement device 5 may be included. In the figure, the flow path for the mass flow controller 100 is modeled as a tank with one inlet and one outlet. There is a porous media element 302 at the inlet and an orifice 304 at the outlet, modeling the control valve 120. The porous media element 302 models a laminar flow element (LFE). LFEs are used in flow bypass implementations, such as shown in FIG. 4, where a portion of the flow is measured in a bypass tube or conduit 29. A LFE is necessary in order to generate a pressure drop across the upstream and downstream ends of the bypass conduit 29, thereby forcing some of the flow through the sensor conduit. The fluid flow first passes through the porous media element 302 and into the internal volume. The flow then exits through the orifice 304 on the right side of the drawing. The orifice 304 can be blocked or unblocked by a valve 306. The flow through the restrictor/porous media element can safely be assumed to be laminar flow. The pressure drop across the orifice 304 will be calculated via an orifice discharge coefficient and adiabatic expansion of the gas.

A resulting conservation of mass formula used to develop a transient fluids model for the flow geometry depicted in FIG. 4, dM/dt=[MassFlowIn−MassFlowOut], resulting in:

$$\frac{dM}{dt} = \frac{P_{inlet}}{R*T_{inlet}*\mu*k}*\left(P_{inlet} - \frac{R*T_{inlet}*M}{V}\right) - \dot{m} \quad (11)$$

Where:
dM/dt=The rate of change of mass within the body,
$P_{inlet}$=The inlet pressure to the body;
$T_{inlet}$=The inlet gas temperature
M=The instantaneous mass within the body;
V=The internal storage volume of the body;
$\dot{m}$=The orifice mass flow rate (obtained from Formulas (9) or (10), as appropriate);
k=The restrictor porous media constant
μ=The absolute gas viscosity.

As with Formulas (9) and (10) the limitations imposed by the Ideal Gas Law in Formula (11) can be obviated via use of the compressibility factor.

Calculation of the Calibration Factor ψ or Series of Calibration Factors $\psi_N$:

In view of the foregoing, those of ordinary skill in the art will appreciate that the present embodiment of the mass flow measurement device 5 involves calculating a thermal sensor based mass flow rate from one or more thermal sensor signals, such as, thermal sensor signal 36, and calculating a pressure sensor based mass flow rate from one or more pressure sensor signals, such as, pressure sensor signals 51a,51b.The thermal sensor based mass flow rate is generally more accurate than the pressure sensor based mass flow rate, i.e. it tends to indicate the actual mass flow rate of the gas more accurately than the pressure mass flow rate, particularly where the fluid flow rate is substantially stable. Although the thermal sensor based mass flow rate is generally accurate it is slow to reflect fluctuations in the flow rate of the fluid. In contrast, the pressure sensor based mass flow rate tends to respond more quickly to fluctuations in the actual mass flow rate of the fluid than the thermal sensor based mass flow rate, i.e. fluctuations in the actual flow rate of the fluid generates a corresponding change in the pressure sensor based mass flow rate more rapidly than in the thermal sensor based mass flow rate. Although the pressure sensor mass flow rate responds quickly to changes in the fluid flow rate, pressure sensor based mass flow do not always accurately reflect the true flow rate of the fluid.

In order to provide a mass flow sensor that is both accurate during substantially stable and fluctuating flow conditions, the present embodiment uses a calibration factor ψ that modifies the pressure sensor based mass flow rate to generate a calibrated pressure sensor based mass flow rate that accurately reflects the true flow rate of the fluid. According, at least during times where the fluid flow rate is experiencing fluctuations, the calibrated pressure sensor based mass flow rate may be used for purposes of determining the actual flow rate of the fluid.

In accordance with the present embodiment, a calibration factor ψ or series of calibration factors $\psi_N$ is determined from both the thermal sensor based mass flow rate and the pressure sensor based mass flow rate. More particularly, in the present embodiment, a calibration factor ψ is determined from one or more formulas that describe a relationship between the thermal sensor based mass flow rate and the pressure sensor based mass flow rate. It is within the scope of the present invention to determine the calibration factor ψ or a series of calibration factors $\psi_N$ using any number of formulas. By way of example, and not limitation, the following formulas (12-14) may be used to determine the calibration factor ψ or series of calibration factors $\psi_N$:

$$\Psi = \frac{\text{thermal sensor based mass flow rate}}{\text{pressure sensor based mass flow rate}} \quad (12)$$

OR $$\Psi = \text{thermal sensor based mass flow rate} - \text{pressure sensor based mass flow rate} \quad (13)$$

OR $$\begin{aligned} thermalsensorbased \text{ mass } flowrate = \\ \Psi_0 + \Psi_1 \text{ } pressuresensorbased \text{ mass } flowrate + \\ \Psi_2^2 \text{ } pressuresensorbased \text{ mass } flowrate^2 + \\ \Psi_N^N \text{ } pressuresensorbased \text{ mass } flowrate^N \end{aligned} \quad (14)$$

The calibration factor ψ or series of calibration factors $\psi_N$ for the polynomial form may be updated as often as desired. By way of example, and not limitation, it may be desirous to periodically update the calibration factor ψ or series of calibration factors $\psi_N$ during substantially stable operating conditions, such as, for example, where a set point, thermal sensor based mass flow rate, and fluid pressure are substantially stable. By way of yet another example, and not limitation, it may be desirous to not update the calibration factor $\psi$ or series of calibration factors $\psi_N$ during certain conditions, such as, for example, where the set point is zero, during set point changes, during rapid pressure changes, or during flow fluctuations. Where updating of the calibration factor $\psi$ or series of calibration factors $\psi_N$ is performed, such updates may occur as often as desired. For example, and not limitation, updating could occur as infrequently as every 10 seconds, or longer, and is not required every 1 ms or for every new reading of pressure, valve current, etc.

Calculation of the Calibrated Pressure Sensor Based Mass Flow Rate:

The pressure sensor based mass flow rate is modified by the calibration factor $\psi$ or series of calibration factors $\psi_N$ to generate the calibrated pressure sensor based mass flow rate. In the present embodiment, the calibration factor $\psi$ modifies the pressure sensor based mass flow rate so that the calibrated pressure sensor based mass flow rate substantially equals the thermal sensor based mass flow rate during substantially stable flow conditions. Advantageously, during and shortly after fluctuating flow conditions, where the thermal sensor based mass flow rate tends to be inaccurate, the calibration factor $\psi$ or series of calibration factors $\psi_N$ modify the pressure sensor based mass flow rate so that, relative to the thermal sensor based mass flow rate, the calibrated pressure sensor based mass flow rate more accurately indicates the actual mass flow rate of the fluid. This advantageous affect can be attributed to the fact that during fluctuating flow conditions, the pressure sensors 50a,50b are able to rapidly detect changes in the fluid pressure level. To the extent that the pressure sensor based mass flow rate is inherently inaccurate, the calibration factor $\psi$ or series of calibration factors $\psi_N$ tend to correct for this. The result is a calibrated pressure based mass flow rate calculation that, compared to the thermal sensor based mass flow rate, more accurate reflects the true mass flow rate of the fluid, particularly during flow fluctuations and shortly after flow fluctuations.

Depending on the particular formula used to determine the calibration factor $\psi$ or series of calibration factors $\psi_N$, the calibrated pressure sensor based mass flow rate may be determined by inserting the calibrated pressure sensor based mass flow rate in place of the thermal sensor based mass flow rate variable in the particular formula used during the determination of the calibration factor $\psi$ or series of calibration factors $\psi_N$ and solving the formula to determine the calibrated pressure based mass flow rate. By way of example, and not limitation, where formula (12) is used to determine the calibration factor $\psi$, the calibrated pressure sensor based mass flow rate may be determined according to the following formula (15):

$$\text{calibrated pressure sensor based mass flow rate} = \frac{\text{pressure sensor based mass } flowrate}{\psi} \quad (15)$$

Figure 2:
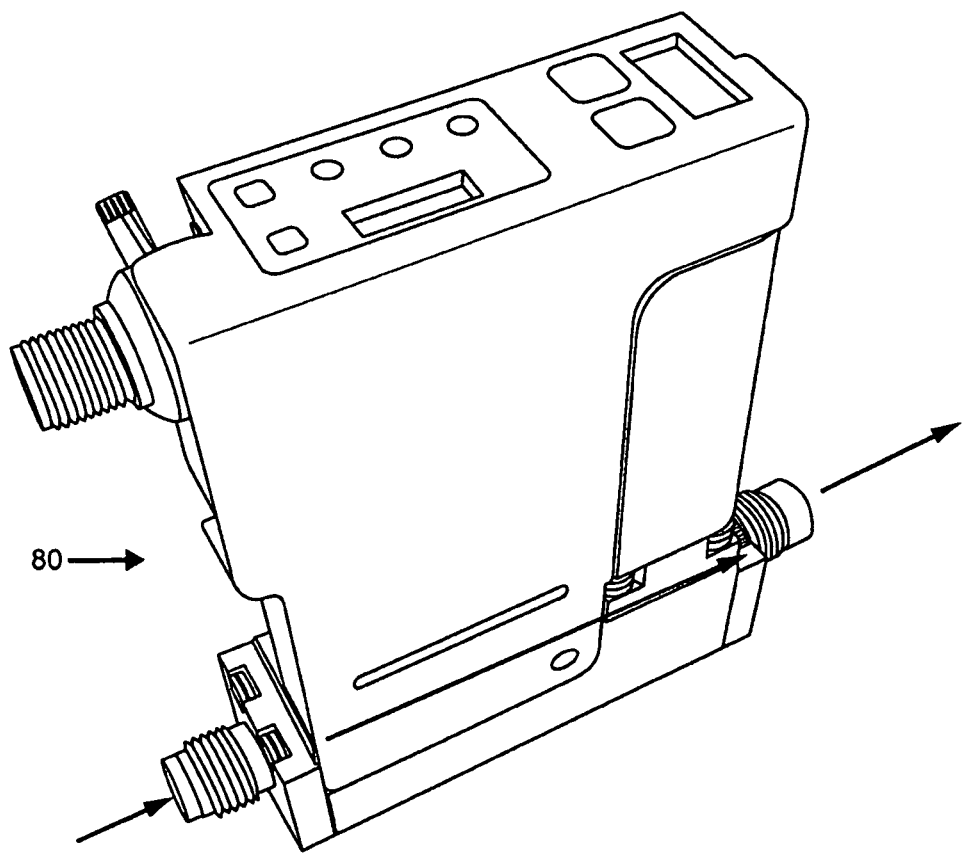
FIG. 2 depicts a perspective view of a mass flow controller of an embodiment of the present invention.
Figure 3:
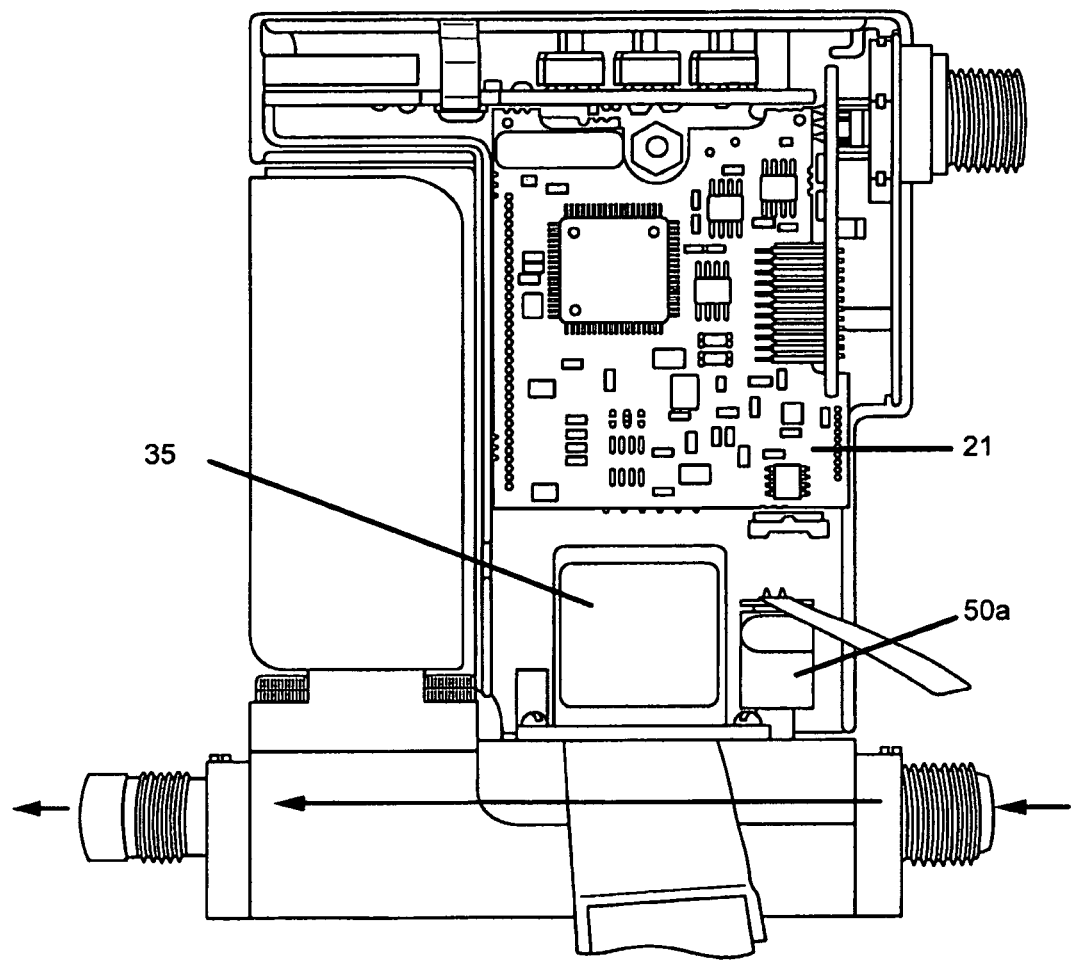
FIG. 3 depicts a sectional view showing a mass flow controller of an embodiment of an embodiment of the present invention with a portion of a cover removed.

Example of a Mass Flow Controller Including Mass Flow Measurement Device 5:

In the present embodiment, the mass flow measurement device 5 is preferably included in a mass flow controller, such as, for example, and not limitation, the mass flow controller 80 shown in FIGS. 2 and 3 or the mass flow controller 100 shown in FIG. 4. Those of ordinary skill in the art will appreciate that mass flow controllers measure and meter out fluids. Mass flow controllers are commonly used in semiconductor fabrication to measure out precise quantities of constituents, such as, for example, for measuring out quantities of gases for fabrication. A mass flow controller must be able to accurately measure out very small mass quantities, such as precise masses of gas.

Mass flow controllers are configured to control the flow rate of the fluid and adjust the flow rate, if necessary, according to a set point. Advantageously, the mass flow measurement can subsequently be used to operate a valve, such as valve 60 in FIG. 1 or valve 306 in FIG. 4, which regulates the flow of fluid. Where the calibrated pressure sensor based mass flow rate or thermal sensor based mass flow rate deviate from the set point, the mass flow controller can use this information to adjust the position of valve in order to return the flow rate to the set point. The valve may be internal to the mass flow controller or external to the mass flow controller. Furthermore, the thermal mass flow sensor 35, pressure sensor 50a,or pressure sensor 50b,may be internal to the mass flow controller or external to the mass flow controller. By way of example, the mass flow controller 80 shown in FIG. 3, includes a valve (not shown), pressure sensor 50a,and thermal mass flow sensor 35 and receives the pressure signal 51b from a second pressure sensor (not shown) that is located downstream from the mass flow sensor 80.

Although in the present embodiment, the thermal mass flow measurement device 5 is preferably used in a mass flow controller, it is within the scope of the present invention for the thermal mass flow measurement device 5 to be used in other systems, such as, for example, chemical process leak detection.

Use of the Mass Flow Sensor to Detect Downstream Pressure Fluctuations:

In situations where the mass flow sensor 5 is used in conjunction with a mass flow controller and the fluid pressure downstream from the valve, such as valve 60 in FIG. 1 experiences fluctuations, calculating the calibrated pressure sensor based mass flow rate as the output 22 is particularly advantageous since the calibrated pressure sensor based mass flow rate will reflect the effect such fluctuations have on the mass flow rate of the fluid as a result of the downstream pressure signal 51b.In contrast, the current standard approach of mathematically accelerating the thermal sensor based mass flow rate and modifying the thermal sensor based mass flow rate with an upstream measured pressure is not capable of detecting a down stream pressure change or the effect such a change has on the flow rate of the fluid.

Combining the Thermal Sensor Based Mass Flow Rate with the Pressure Sensor Based Mass Flow Rate:

Regardless of the system in which the mass flow sensor 5 operates, although the output signal 22 may always indicate the calibrated pressure sensor based mass flow rate, those of ordinary skill in the art will appreciate that in alternative embodiments the one or more electronics 21 may switch between providing the calibrated pressure sensor based mass flow rate and the thermal sensor based mass flow rate as the output signal 22. For example, and not limitation, the calibrated pressure mass flow rate may be provided as the output signal 22 during certain conditions, such as, for example, when the flow rate is experiencing a fluctuation and there is a pressure spike, which may be determined by storing previous pressure readings and comparing the stored readings to current readings. In contrast, the thermal sensor based mass flow signal may be provided as the output signal 22 during substantially stable operating conditions, such as, for example, where the set point, thermal flow signal, flow rate, and pressure are substantially stable.

By way of yet another example, and not limitation, in alternative embodiments, a blended mass flow rate may be provided as an output signal 22. The blended mass flow rate may be determined by using one or more weighing factors to generate a weighed calibration pressure sensor based mass flow rate and a weighed thermal sensor based mass flow rate, which are combined to determine the blended mass flow rate. Those of ordinary skill in the art will appreciate that the weighting factors may depend on specific conditions. The weighting can range from 0% thermal sensor based mass flow rate and 100% calibrated pressure sensor based mass flow rate to 100% thermal sensor based mass flow rate and 0% calibrated pressure sensor based mass flow rate. The weighting factors may vary depending of conditions. The blending could be as simple as a weighted average. Alternatively, by way of example, and not limitation, where there is a set point change and pressure spike, weighing factor for calibrated pressure sensor based mass flow rate may be greater than the weighing factor for thermal sensor based mass flow rate. By way of example, and not limitation, where there is a substantially stable flow and pressure, weighing factor for thermal sensor based mass flow rate may be greater than the weighing factor for the calibrated pressure sensor based mass flow rate.

Reverse Calibration of the Thermal Sensor Based Mass Flow Rate:

By way of yet another example, and not limitation, in alternative embodiments, by way of example, and not limitation, where the specific heat of the fluid is not known, and the density and viscosity of the fluid are known, and in situations where the pressure sensor based mass flow rate tends to be more accurate than the thermal sensor based mass flow rate, even during substantially stable fluid flow conditions, it is within the scope of alternative embodiments to reverse the calibration process, and generate a calibrated thermal sensor mass flow rate in a manner that is similar to the determination of the calibrated pressure sensor based mass flow rate. The calibrated sensor based mass flow rate may be determined by inserting the calibrated thermal sensor based mass flow rate in place of the pressure sensor based mass flow rate variable in the particular formula used during the determination of the calibration factor $\Psi$ or series of calibration factors $\Psi_N$ and solving the formula to determine the calibrated thermal based mass flow rate. By way example, where formula (12) is used to determine the calibration factor $\Psi$, the calibrated thermal sensor based mass flow rate may be determined according to the following formula (16):

$$\text{calibrated thermal sensor based mass flow rate} = \Psi \times \text{thermal sensor based mass flow rate} \quad (16)$$

Outputting the calibrated thermal sensor based mass flow rate may be particular advantageous where the fluid includes or consists of toxic, corrosive, or explosive gasses.

Use of the Calibrated Pressure Sensor Based Mass Flow Rate and Thermal Sensor Based Mass Flow Rate to Determine Fluid Properties:

By way of yet another example, and not limitation, in alternative embodiments, during substantially stable flow conditions, since the calibrated pressure sensor based mass flow rate will substantially equal the thermal sensor based mass flow rate, certain unknown properties of the fluid can be determined. Formulas useful for determining the respective thermal sensor based mass flow rate and the pressure sensor based mass flow rate may be combined into one formula. Since the thermal sensor signal value will be known and the pressure sensor values will be known, other possibly unknown variables, such as, for example, and not limitation, specific heat of the fluid, density of the fluid, viscosity of the fluid, etc., may be solved.

Use of a Mass Flow Sensor 5 to Detect Improper Valve Sequencing:

In embodiments where the mass flow sensor 5 is included in a thermal mass flow controller, such as, for example, and not limitation, the mass flow controller 80 shown in FIGS. 2 and 3 or the mass flow controller 100 shown in FIG. 4, the mass flow sensor 5 may also be used to detect improper valve sequencing. Those of ordinary skill in the art will appreciate that improper valve sequencing may occur where a user commands a valve that is upstream from the mass flow sensor 5 to close and the mass flow controller 100 set point is not 0. In such a situation, the pressure sensor based mass flow rate will have an undefined value since the pressure level will be 0. As a result a valve controlled by the mass flow controller will be commanded to completely open in an attempt to increase the flow rate of the fluid.

In such a situation the mass flow sensor 5 may trigger an alarm and alert that there is not enough pressure. In response, the upstream valve will likely be opened; and, in response, there will be a pressure spike and the mass flow controller will command the valve to close. Using such techniques it is possible to store a number valve positions. Since there will be a characteristic trend in the valve position, i.e., the valve position will completely open, then nearly close, and eventually stabilize, this may identify improper valve sequencing, which cannot be detected by the pressure measurement alone.

Those of ordinary skill in the art will appreciate that the opposite valve sequencing condition could also occur, i.e. the upstream valve could be commanded to open immediately before or at the same time as the set point is provided to the mass flow controller. This sequence will produce a different but distinguishable trend in the valve position, i.e. a pressure spike and a set point at the same time. The valve position will initially close, however, as the pressure stabilizes, the computed valve position will stabilize. Again, this trend could be used to identify such improper valve sequencing, which cannot be detected by pressure measurement alone.

Use of the Mass Flow Sensor 5 to Detect Insufficient or Excessive Inlet Fluid Pressure:

In embodiments where the mass flow sensor 5 is used with a mass flow controller, such as, for example, the mass flow controller 100 shown in FIG. 4, the mass flow sensor 5 may be used to identify insufficient or excessive inlet fluid pressure.

In the case where the inlet pressure of the fluid is insufficient to attain the set point, the calibrated pressure sensor based mass flow rate will reflect this. In response, the mass flow controller 100 will adjust the valve 306 position in order to increase the calibrated pressure sensor based mass flow rate. In doing this, the mass flow controller 100 will determine the particular valve height that should lead to the calibrated pressure sensor based mass flow rate being substantially equal the set point. In the case, however, where the inlet fluid pressure is insufficient to achieve the set point, the calculated valve height will be unusually high. In the opposite case where the inlet pressure is too high, the calculated valve 306 height that is necessary to attain the set point will be unusually low.

In such a situations, the calculated valve 306 height necessary to achieve the set point could be compared to acceptable limits, such as a minimum valve height limit or maximum valve height limit. In the event the calculated valve height necessary to attain the set point is less than the minimum valve height limit or greater than the maximum valve heath value, an alarm signal may be generated that indicates excessive or insufficient inlet pressure.

In the present embodiment, the acceptable limits may be any values that indicate the possibility of insufficient inlet pressure or excessive inlet pressure. For example, and not limitation, in the mass flow controller 100 shown in FIG. 4, the maximum valve height limit may be d/4, where d equals the diameter of orifice 304.

Using the Calibration Factor $\Psi$ or Series of Calibration Factors $\Psi_N$ to Detect Aging in Components, Defectives in Components, or Clogging:

Those of ordinary skill in the art will appreciate that it is within the scope of the present invention to store the generated calibration factor $\Psi$ or series of calibration factors $\Psi_N$ and monitor how these values change over time. Those of ordinary skill in the art will appreciate that changes in the calibration factor $\Psi$ or series of calibration factors $\Psi_N$ may be used to detect aging of components, defects in components, or clogging. By way of example, where the calibration factor $\Psi$ or series of calibration factors $\Psi_N$ slowly develop a trend of increasing or decreasing over time this may indicate aging valve springs or clogging of the orifice, such as orifice 304 in FIG. 4. Accordingly, by analyzing the effect that aging, defects, or clogging has on the calibration factor $\Psi$ or series of calibration factors $\Psi_N$ acceptable limits for these values may be determined. For example, in the case of clogging, where the calibration factor $\Psi$ is determined according to formula (11), a clogged restrictor will tend to increase the calibration factor $\Psi$ value over time. Regardless of how the limits are determined, where the calibration factor $\Psi$ or series of calibration factors $\Psi_N$ falls outside of one or more acceptable limits, such as by being greater than or less than certain limits, an alarm may be generated that indicates that the device needs to be serviced. Similarly, if a component catastrophically breaks or corrodes, a drastic change in calibration factor $\Psi$ or series of calibration factors $\Psi_N$ would occur over a relatively short period of time. Again, this information may be used to generate an alarm that indicates that the device needs to be serviced.

Those of ordinary skill in the art will appreciate that the principals of aforementioned embodiments may be programmed on a computer program product, such as software, that is installed on the one or more electronics 21.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. The detailed descriptions of the above embodiments are not exhaustive descriptions of all embodiments contemplated by the inventors to be within the scope of the invention. By way of example and not limitation, in embodiments wherein the mass flow sensor 5 is included in a mass flow controller, the valve controlled by the mass flow controller may be internal to the mass flow controller or external to the mass flow controller. Furthermore it is within the scope of the present invention for the thermal sensor based mass flow rate, the pressure sensor based mass flow rate, calibration factor $\Psi$ or series of calibration factors $\Psi_N$, the calibrated pressure sensor based mass flow rate, or the calibrated thermal sensor based mass flow rate to be determined using any formula.

Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will, recognize. The teachings provided herein may be applied to other embodiments than those described above and shown in the accompanying figures. Accordingly, the scope of the invention is determined from the following claims.

We claim:

1. A system for determining a flow rate of a fluid, comprising:
   at least one conduit defining a flow path along which the fluid flows;
   at least one thermal sensor that generates a thermal sensor signal, which is proportional to a mass flow rate of the fluid;
   at least one pressure sensor that generates a pressure sensor signal, which indicates the pressure of the fluid;
   one or more electronics that:
      generate a thermal sensor based mass flow rate for the fluid, where the thermal sensor based mass flow rate is determined at least in part from the thermal sensor signal;
      generate a pressure sensor based mass flow rate for the fluid, wherein the pressure sensor based mass flow rate is determined at least in part from the pressure sensor signal;
      generate at least one calibration factor using the thermal sensor based mass flow rate and the pressure sensor based mass flow rate;
      generate a calibrated pressure sensor based mass flow rate by using the at least one calibration factor to modify the pressure sensor based mass flow rate;
      generate a calibrated thermal sensor based mass flow rate by using the at least one calibration factor to modify the thermal sensor based mass flow rate;
      determine whether operating conditions are substantially stable;
      output the calibrated thermal sensor based mass flow rate in response to a determination that the operating conditions are substantially stable; and
      output the calibrated pressure sensor based mass flow rate in response to a determination that the operating conditions are not substantially stable.

2. The system for determining a flow rate of a fluid according to claim 1, wherein:
   the at least one pressure sensor includes first and second pressure sensors that generate pressure sensor signals that indicate the pressure of the fluid; and
   the pressure sensor based mass flow rate is determined at least in part from the pressure sensor signals.

3. The system for determining a flow rate of a fluid according to claim 1, wherein the at least one pressure sensor is a differential pressure cell, which directly measures the pressure differential between two points in the fluid flow.

4. The system for determining a flow rate of a fluid according to claim 1, further comprising:
   a valve that regulates the fluid flow, wherein:
   the at least one pressure sensor includes first and second pressure sensors;
   the first pressure sensor is located upstream from the valve and the second pressure sensor is located downstream from the valve;
   the first and second pressure sensors generate pressure sensor signals that indicate the pressure of the fluid; and
   the pressure sensor based mass flow rate is determined at least in part from the pressure sensor signals.

5. The system for determining a flow rate of a fluid according to claim 1, wherein:
the at least one calibration factor includes a series of calibration factors; and
the calibrated pressure sensor based mass flow rate is generated using the series of calibration factors to modify the pressure sensor based mass flow rate.

6. The system for determining a flow rate of a fluid according to claim 1, wherein the calibrated pressure sensor based mass flow rate substantially equals a thermal sensor mass flow rate during substantially stable flow conditions.

7. The system for determining a flow rate of a fluid according to claim 1, wherein the calibrated pressure sensor based mass flow rate, relative to a thermal sensor mass flow rate, more accurately reflects the fluid flow rate during or shortly after fluctuating fluid flow conditions.

8. The system for determining a flow rate of a fluid according to claim 1, further comprising a mass flow controller that controls a valve position, wherein the calibrated pressure sensor based mass flow rate is used by the mass flow controller to control the position of the valve.

9. The system for determining a flow rate of a fluid according to claim 1, wherein:
the one or more electronics generate a blended mass flow rate that is determined by using one or more weighing factors to generate a weighed calibrated pressure sensor based mass flow rate and a weighed thermal sensor based mass flow rate, which are combined to determine the blended mass flow rate.

10. The system for determining a flow rate of a fluid according to claim 1, wherein, during stable flow conditions, the one or more electronics determines one or more fluid variables other than the fluid flow rate, wherein the one or more fluid variables are determined, at least in part from the pressure sensor signal and the thermal sensor signal 11. The system for determining a flow rate of a fluid according to claim 1, wherein the one or more electronics generate an error signal when the at least one calibration factor falls outside of one or more acceptable limits.

12. The system for determining a flow rate of a fluid according to claim 1, wherein:
the calibrated pressure sensor based mass flow rate is used to control a valve;
the one or more electronics store a plurality of valve positions and determine whether the stored valve positions indicate a trend that is characteristic of improper valve sequencing; and
the one or more electronics generate an error signal in the event an improper valve sequencing trend is detected.

13. The system for determining a flow rate of a fluid according to claim 1, wherein:
the calibrated pressure sensor based mass flow rate is used to control a valve;
the one or more electronics calculate the a valve height necessary to achieve a flow set point; and
the one or more electronics generate an error signal in the event the calculated valve height falls outside acceptable limits.

14. A method of determining a flow rate of a fluid, comprising the steps of:
using at least one thermal sensor to generate a thermal sensor signal, which is proportional to a mass flow rate of the fluid;
using at least one pressure sensor to generate a pressure sensor measurement signal, which indicates the pressure of the fluid;
using one or more electronics to:
generate a thermal sensor based mass flow rate for the fluid, where the thermal sensor based mass flow rate is determined at least in part from the thermal sensor measurement signal;
generate a pressure sensor based mass flow rate for the fluid, wherein the pressure sensor based mass flow rate is determined at least in part from the pressure sensor signal;
generate at least one calibration factor using the thermal sensor based mass flow rate and the pressure sensor based mass flow rate;
generate a calibrated pressure sensor based mass flow rate by using the at least one calibration factor to modify the pressure sensor based mass flow rate;
generate a calibrated thermal sensor based mass flow rate by using the at least one calibration factor to modify the thermal sensor based mass flow rate;
determine whether operating conditions are substantially stable;
output the calibrated thermal sensor based mass flow rate in response to a determination that the operating conditions are substantially stable; and
output the calibrated pressure sensor based mass flow rate in response to a determination that the operating conditions are not substantially stable.

15. The method of determining a flow rate of a fluid according to claim 14, wherein:
the at least one pressure sensor includes first and second pressure sensors that generate pressure sensor signals that indicate the pressure of the fluid; and
the pressure sensor based mass flow rate is determined at least in part from the pressure sensor signals.

16. The method for determining a flow rate of a fluid according to claim 14, wherein the at least one pressure sensor is a differential pressure cell, which directly measures the pressure differential between two points in the fluid flow.

17. The method of determining a flow rate of a fluid according to claim 14, further comprising the step of:
using a valve to regulate the fluid flow, wherein:
the at least one pressure sensor includes first and second pressure sensors;
the first pressure sensor is located upstream from the valve and the second pressure sensor is located downstream from the valve;
the first and second pressure sensors generate pressure sensor signals that indicate the pressure of the fluid; and
the pressure sensor based mass flow rate is determined at least in part from the pressure sensor signals.

18. The method of determining a flow rate of a fluid according to claim 14, wherein:
the at least one calibration factor includes a series of calibration factors; and
the calibrated pressure sensor based mass flow rate is generated using the series of calibration factors to modify the pressure sensor based mass flow rate.

19. The method of determining a flow rate of a fluid according to claim 14, wherein the calibrated pressure sensor based mass flow rate substantially equals a thermal sensor mass flow rate during substantially stable flow conditions.

20. The method of determining a flow rate of a fluid according to claim 14, wherein the calibrated pressure sensor based mass flow rate, relative to the a thermal sensor mass flow rate, more accurately reflects the fluid flow rate during or shortly after fluctuating fluid flow conditions.

21. The method of determining a flow rate of a fluid according to claim 14, further comprising the step of using a mass flow controller to control a valve position, wherein the calibrated pressure sensor based mass flow rate is used by the mass flow controller to control the position of the valve.

22. The method of determining a flow rate of a fluid according to claim 14, further comprising the step of:
using the one or more electronics to generate a blended mass flow rate determined by using one or more weighing factors to generate a weighed calibrated pressure sensor based mass flow rate and a weighed thermal sensor based mass flow rate, which are combined to determine the blended mass flow rate.

23. The method of determining a flow rate of a fluid according to claim 14, further comprising the step of using the one or more electronics, during stable flow conditions, to determine one or more fluid variables other than the fluid flow rate, wherein the one or more fluid variables are determined, at least in part from the pressure sensor signal and the thermal sensor signal.

24. The method of determining a flow rate of a fluid according to claim 14, further comprising the step of using the one or more electronics to generate an error signal when the at least one calibration factor falls outside of one or more acceptable limits.

25. The method of determining a flow rate of a fluid according to claim 14, further comprising the steps of:
using the calibrated pressure sensor based mass flow rate to control a valve;
using the one or more electronics to store a plurality of valve positions and determine whether the stored valve positions indicate a trend that is characteristic of improper valve sequencing; and
using the one or more electronics to generate an error signal in the event an improper valve sequencing trend is detected.

26. The method of determining a flow rate of a fluid according to claim 14, wherein:
using the calibrated pressure sensor based mass flow rate to control a valve;
using the one or more electronics to calculate a valve height necessary to achieve a flow set point; and
using the one or more electronics to generate an error signal in the event the calculated valve height falls outside acceptable limits.

27. A non-transitory computer usable medium including executable code for executing a process for determining a flow rate of a fluid, the process comprising:
generating a thermal sensor based mass flow rate for the fluid, where the thermal sensor based mass flow rate is determined at least in part from a thermal sensor measurement signal from a thermal mass flow sensor;
generating a pressure sensor based mass flow rate for the fluid, wherein the pressure sensor based mass flow rate is determined at least in part from a pressure sensor signal from a pressure sensor;
generating at least one calibration factor using the thermal sensor based mass flow rate and the pressure sensor based mass flow rate;
generating a calibrated pressure sensor based mass flow rate by using the at least one calibration factor to modify the pressure sensor based mass flow rate;
generating a calibrated thermal sensor based mass flow rate by using the at least one calibration factor to modify the thermal sensor based mass flow rate;
determining whether operating conditions are substantially stable;
outputting the calibrated thermal sensor based mass flow rate in response to a determination that the operating conditions are substantially stable; and
outputting the calibrated pressure sensor based mass flow rate in response to a determination that the operating conditions are not substantially stable.

28. The non-transitory computer usable medium according to claim 27, wherein the process further comprises determining the pressure sensor based mass flow rate at least in part from pressure sensor signals received from at least two pressure sensors.

29. The non-transitory computer usable medium according to claim 27, wherein the process further comprises determining the pressure sensor based mass flow rate at least in part from at least one pressure sensor comprised of a differential pressure cell which directly measures the pressure differential between two points in the fluid flow.

30. The non-transitory computer usable medium according to claim 27, wherein the process further comprises:
using the calibrated pressure sensor based mass flow rate to control a valve that regulates fluid flow; and
determining the pressure sensor based mass flow rate at least in part from a-pressure sensor signals received from at least two a-pressure sensors, wherein a first pressure sensor is located upstream from the valve and a second pressure sensor is located downstream from the valve.

31. The non-transitory computer usable medium according to claim 27, wherein the process further comprises:
generating a series of calibration factors using the thermal sensor based mass flow rate and the pressure sensor based mass flow rate; and
generating the calibrated pressure sensor based mass flow rate using the series of calibration factors to modify the pressure sensor based mass flow rate.

32. The non-transitory computer usable medium according to claim 27, wherein the process further comprises generating the calibrated pressure sensor based mass flow rate so that the calibrated pressure sensor based mass flow rate substantially equals a thermal sensor mass flow rate during substantially stable flow conditions.

33. The non-transitory computer usable medium according to claim 27, wherein the process further comprises generating the calibrated pressure sensor based mass flow rate so that the calibrated pressure sensor based mass flow rate, relative to a thermal sensor mass flow rate, more accurately reflects the fluid flow rate during or shortly after fluctuating fluid flow conditions.

34. The non-transitory computer usable medium according to claim 27, wherein the process further comprises using the calibrated pressure sensor based mass flow rate to control a position of a valve.

35. The non-transitory computer usable medium according to claim 27, wherein the process further comprises using one or more electronics to generate a blended mass flow rate determined by using one or more weighing factors to generate a weighed calibrated pressure sensor based mass flow rate and a weighed thermal sensor based mass flow rate, which are combined to determine the blended mass flow rate.

36. The non-transitory computer usable medium according to claim 27, wherein the process further comprises using one or more electronics, during stable flow conditions, to determine one or more fluid variables other than the fluid flow rate, wherein the one or more fluid variables are determined, at least in part from the pressure sensor signal and the thermal sensor signal.

37. The non-transitory computer usable medium according to claim 27, wherein the process further comprises using one or more electronics to generate an error signal when the at least one calibration factor falls outside of one or more acceptable limits.

38. The non-transitory computer usable medium according to claim 27, wherein the process further comprises:
   using the calibrated pressure sensor based mass flow rate to control a valve;
   using one or more electronics to store a plurality of valve positions and determine whether the stored valve positions indicate a trend that is characteristic of improper valve sequencing; and
   using the one or more electronics to generate an error signal in the event an improper valve sequencing trend is detected.

39. The non-transitory computer usable medium according to claim 27, wherein the process further comprises:
   using the calibrated pressure sensor based mass flow rate to control a valve;
   using one or more electronics to calculate a valve height necessary to achieve a flow set point; and
   using the one or more electronics to generate an error signal in the event the calculated valve height falls outside acceptable limits.

40. A system for determining a flow rate of a fluid, comprising:
   at least one conduit defining a flow path along which the fluid flows;
   at least one thermal sensor that generates a thermal sensor signal, which is proportional to a mass flow rate of the fluid;
   at least one pressure sensor that generates a pressure sensor signal, which indicates the pressure of the fluid;
   one or more electronics that:
      generate a thermal sensor based mass flow rate for the fluid, where the thermal sensor based mass flow rate is determined at least in part from the thermal sensor signal;
      generate a pressure sensor based mass flow rate for the fluid, wherein the pressure sensor based mass flow rate is determined at least in part from the pressure sensor signal;
      generate at least one calibration factor using the thermal sensor based mass flow rate and the pressure sensor based mass flow rate;
      generate a calibrated thermal sensor based mass flow rate by using the at least one calibration factor to modify the thermal sensor based mass flow rate; and
      automatically update periodically the at least one calibration factor during substantially stable operating conditions when a set point, the thermal sensor based mass flow rate, and fluid pressure are substantially stable.

41. The system for determining a flow rate of a fluid according to claim 40, wherein:
   the at least one pressure sensor includes first and second pressure sensors that generate pressure sensor signals that indicate the pressure of the fluid; and
   the pressure sensor based mass flow rate is determined at least in part from the pressure sensor signals.

42. The system for determining a flow rate of a fluid according to claim 40, wherein the at least one pressure sensor is a differential pressure cell, which directly measures the pressure differential between two points in the fluid flow.

43. The system for determining a flow rate of a fluid according to claim 40, further comprising:
   a valve that regulates the fluid flow, wherein:
   the at least one pressure sensor includes first and second pressure sensors;
   the first pressure sensor is located upstream from the valve and the second pressure sensor is located downstream from the valve;
   the first and second pressure sensors generate pressure sensor signals that indicate the pressure of the fluid; and
   the pressure sensor based mass flow rate is determined at least in part from the pressure sensor signals.

44. The system for determining a flow rate of a fluid according to claim 40, wherein:
   the at least one calibration factor includes a series of calibration factors; and
   the calibrated thermal sensor based mass flow rate is generated using the series of calibration factors to modify the thermal sensor based mass flow rate.

45. The system for determining a flow rate of a fluid according to claim 40, wherein the calibrated thermal sensor based mass flow rate substantially equals the pressure sensor mass flow rate during substantially stable flow conditions.

46. The system for determining a flow rate of a fluid according to claim 40, wherein the calibrated thermal sensor based mass flow rate, relative to the thermal sensor based mass flow rate, more accurately reflects the fluid flow rate.

47. The system for determining a flow rate of a fluid according to claim 40, further comprising a mass flow controller that controls a valve position, wherein the calibrated thermal sensor based mass flow rate is used by the mass flow controller to control the position of the valve.

48. The system for determining a flow rate of a fluid according to claim 40, wherein the one or more electronics generates an output signal that indicates the calibrated thermal sensor based mass flow rate.

49. The system for determining a flow rate of a fluid according to claim 40, wherein, during stable flow conditions, the one or more electronics determines one or more fluid variables other than the fluid flow rate, wherein the one or more fluid variables are determined, at least in part from the pressure sensor signal and the thermal sensor signal 50. The system for determining a flow rate of a fluid according to claim 40, wherein the one or more electronics generate an error signal when the at least one calibration factor falls outside of one or more acceptable limits.

51. The system for determining a flow rate of a fluid according to claim 40, wherein:
   the calibrated thermal sensor based mass flow rate is used to control a valve;
   the one or more electronics store a plurality of valve positions and determine whether the stored valve positions indicate a trend that is characteristic of improper valve sequencing; and
   the one or more electronics generate an error signal in the event an improper valve sequencing trend is detected.

52. The system for determining a flow rate of a fluid according to claim 40, wherein:
   the calibrated thermal sensor based mass flow rate is used to control a valve;
   the one or more electronics calculate the a valve height necessary to achieve a flow set point; and
   the one or more electronics generate an error signal in the event the calculated valve height falls outside acceptable limits.

53. A method of determining a flow rate of a fluid, comprising the steps of:

using at least one thermal sensor to generate a thermal sensor signal, which is proportional to a mass flow rate of the fluid;

using at least one pressure sensor to generate a pressure sensor measurement signal, which indicates the pressure of the fluid;

using one or more electronics to:
generate a thermal sensor based mass flow rate for the fluid, where the thermal sensor based mass flow rate is determined at least in part from the thermal sensor measurement signal;
generate a pressure sensor based mass flow rate for the fluid, wherein the pressure sensor based mass flow rate is determined at least in part from the pressure sensor signal;
generate at least one calibration factor using the thermal sensor based mass flow rate and the pressure sensor based mass flow rate; and
generate a calibrated thermal sensor based mass flow rate by using the at least one calibration factor to modify the thermal sensor based mass flow rate; and
automatically update periodically the at least one calibration factor during substantially stable operating conditions when a set point, the thermal sensor based mass flow rate, and fluid pressure are substantially stable.

54. The method of determining a flow rate of a fluid according to claim 53, wherein:
the at least one pressure sensor includes first and second pressure sensors that generate pressure sensor signals that indicate the pressure of the fluid; and
the pressure sensor based mass flow rate is determined at least in part from the pressure sensor signals.

55. The method for determining a flow rate of a fluid according to claim 53, wherein the at least one pressure sensor is a differential pressure cell, which directly measures the pressure differential between two points in the fluid flow.

56. The method of determining a flow rate of a fluid according to claim 53, further comprising the step of:
using a valve to regulate the fluid flow, wherein:
the at least one pressure sensor includes first and second pressure sensors;
the first pressure sensor is located upstream from the valve and the second pressure sensor is located downstream from the valve;
the first and second pressure sensors generate pressure sensor signals that indicate the pressure of the fluid; and
the pressure sensor based mass flow rate is determined at least in part from the pressure sensor signals.

57. The method of determining a flow rate of a fluid according to claim 53, wherein:
the at least one calibration factor includes a series of calibration factors; and
the calibrated thermal sensor based mass flow rate is generated using the series of calibration factors to modify the thermal sensor based mass flow rate.

58. The method of determining a flow rate of a fluid according to claim 53, wherein the calibrated thermal sensor based mass flow rate substantially equals the pressure sensor mass flow rate during substantially stable flow conditions.

59. The method of determining a flow rate of a fluid according to claim 53, wherein the calibrated thermal sensor based mass flow rate, relative to the thermal sensor based mass flow rate, more accurately reflects the fluid flow rate.

60. The method of determining a flow rate of a fluid according to claim 53, further comprising the step of using a mass flow controller to control a valve position, wherein the calibrated thermal sensor based mass flow rate is used by the mass flow controller to control the position of the valve 61. The method of determining a flow rate of a fluid according to claim 53, further comprising the step of using the one or more electronics to generate an output signal that indicates the calibrated thermal sensor based mass flow rate.

62. The method of determining a flow rate of a fluid according to claim 53, further comprising the step of using the one or more electronics, during stable flow conditions, to determine one or more fluid variables other than the fluid flow rate, wherein the one or more fluid variables are determined, at least in part from the pressure sensor signal and the thermal sensor signal.

63. The method of determining a flow rate of a fluid according to claim 53, further comprising the step of using the one or more electronics to generate an error signal when the at least one calibration factor falls outside of one or more acceptable limits.

64. The method of determining a flow rate of a fluid according to claim 53, further comprising the steps of:
using the calibrated thermal sensor based mass flow rate to control a valve;
using the one or more electronics to store a plurality of valve positions and determine whether the stored valve positions indicate a trend that is characteristic of improper valve sequencing; and
using the one or more electronics to generate an error signal in the event an improper valve sequencing trend is detected.

65. The method of determining a flow rate of a fluid according to claim 53, wherein:
using the calibrated thermal sensor based mass flow rate to control a valve;
using the one or more electronics to calculate a valve height necessary to achieve a flow set point; and
using the one or more electronics to generate an error signal in the event the calculated valve height falls outside acceptable limits.

66. A non-transitory computer usable medium including executable code for executing a process for determining a flow rate of a fluid, the process comprising:
generating a thermal sensor based mass flow rate for the fluid, where the thermal sensor based mass flow rate is determined at least in part from a thermal sensor measurement signal from a thermal mass flow sensor;
generating a pressure sensor based mass flow rate for the fluid, wherein the pressure sensor based mass flow rate is determined at least in part from a pressure sensor signal from a pressure sensor;
generating at least one calibration factor using the thermal sensor based mass flow rate and the pressure sensor based mass flow rate;
generating a calibrated thermal sensor based mass flow rate by using the at least one calibration factor to modify the thermal sensor based mass flow rate; and
automatically updating periodically the at least one calibration factor during substantially stable operating conditions when a set point, the thermal sensor based mass flow rate, and fluid pressure are substantially stable.

67. The non-transitory computer usable medium according to claim 66, wherein the process further comprises determining the pressure sensor based mass flow rate at least in part from pressure sensor signals received from at least two pressure sensors.

68. The non-transitory computer usable medium according to claim 66, wherein the process further comprises determining the pressure sensor based mass flow rate at least in part from at least one pressure sensor comprised of a differential pressure cell which directly measures the pressure differential between two points in the fluid flow.

69. The non-transitory computer usable medium according to claim 66, wherein the process further comprises:
using the calibrated thermal sensor based mass flow rate to control a valve that regulates fluid flow; and
determining the pressure sensor based mass flow rate at least in part from a-pressure sensor signals received from at least two pressure sensors, wherein a first pressure sensor is located upstream from the valve and the a second pressure sensor is located downstream from the valve.

70. The non-transitory computer usable medium according to claim 66, wherein the process further comprises:
generating a series of calibration factors using the thermal sensor based mass flow rate and the pressure sensor based mass flow rate; and
generating the calibrated thermal sensor based mass flow rate using the series of calibration factors to modify the thermal sensor based mass flow rate.

71. The non-transitory computer usable medium according to claim 66, wherein the process further comprises generating the calibrated thermal sensor based mass flow rate so that the calibrated thermal sensor based mass flow rate substantially equals the thermal sensor based mass flow rate during substantially stable flow conditions.

72. The non-transitory computer usable medium according to claim 66, wherein the process further comprises generating the calibrated thermal sensor based mass flow rate so that the calibrated thermal sensor based mass flow rate, relative to the thermal sensor based mass flow rate, more accurately reflects the fluid flow rate.

73. The non-transitory computer usable medium according to claim 66, wherein the process further comprises using the calibrated thermal sensor based mass flow rate to control a position of a valve.

74. The non-transitory computer usable medium according to claim 66, wherein the process further comprises using one or more electronics to generate an output signal that indicates the calibrated thermal sensor based mass flow rate.

75. The non-transitory computer usable medium according to claim 66, wherein the process further comprises using one or more electronics, during stable flow conditions, to determine one or more fluid variables other than the fluid flow rate, wherein the one or more fluid variables are determined, at least in part from the pressure sensor signal and the thermal sensor signal.

76. The non-transitory computer usable medium according to claim 66, wherein the process further comprises using one or more electronics to generate an error signal when the at least one calibration factor falls outside of one or more acceptable limits.

77. The non-transitory computer usable medium according to claim 66, wherein the process further comprises:
using the calibrated thermal sensor based mass flow rate to control a valve;
using one or more electronics to store a plurality of valve positions and determine whether the stored valve positions indicate a trend that is characteristic of improper valve sequencing; and
using the one or more electronics to generate an error signal in the event an improper valve sequencing trend is detected.

78. The non-transitory computer usable medium according to claim 66, wherein the process further comprises:
using the calibrated thermal sensor based mass flow rate to control a valve;
using one or more electronics to calculate a valve height necessary to achieve a flow set point; and
using the one or more electronics to generate an error signal in the event the calculated valve height falls outside acceptable limits.

* * * * *